United States Patent [19]

Furukawa et al.

[11] Patent Number: 5,129,861
[45] Date of Patent: Jul. 14, 1992

[54] SHEATH STRUCTURE FOR METER CABLES

[75] Inventors: Noriyuki Furukawa; Yoshiyuki Murofushi, both of Shizuoka, Japan

[73] Assignees: Yazaki Corporation, Tokyo; Cable Technica Co., Ltd., Shizuoka, both of Japan

[21] Appl. No.: 647,203

[22] Filed: Jan. 28, 1991

Related U.S. Application Data

[63] Continuation of Ser. No. 345,332, May 1, 1989, abandoned.

[30] Foreign Application Priority Data

May 2, 1988 [JP] Japan ................. 63-107546

[51] Int. Cl.$^5$ .................... F16C 1/26; F16L 11/08
[52] U.S. Cl. ................... 464/174; 138/131; 138/132; 138/174; 464/52; 464/903
[58] Field of Search ............ 464/52, 173, 174, 903; 138/130-132, 153, 174; 74/502.5

[56] References Cited

U.S. PATENT DOCUMENTS

| 532,902 | 1/1895 | Palmer | 138/130 X |
|---|---|---|---|
| 2,671,325 | 3/1954 | Barnes | 464/174 |
| 3,230,979 | 1/1966 | Tenreiro | 464/174 |
| 3,242,691 | 3/1966 | Robinson et al. | 138/130 X |
| 3,266,527 | 8/1966 | Ross | 138/130 X |
| 4,112,708 | 9/1978 | Fukuda | 464/52 X |
| 4,196,464 | 4/1980 | Russell | 138/130 X |
| 4,238,260 | 12/1980 | Washkewicz | 138/153 X |
| 4,308,895 | 1/1982 | Greco | 138/174 X |
| 4,317,000 | 2/1982 | Ferer | 138/130 X |
| 4,343,333 | 8/1982 | Keister | 138/174 X |
| 4,380,252 | 4/1983 | Gray et al. | 138/132 X |
| 4,425,919 | 1/1984 | Alston Jr. et al. | 138/130 X |
| 4,495,134 | 1/1985 | Ouchi et al. | 138/131 X |
| 4,617,213 | 10/1986 | Asano et al. | 138/153 X |

FOREIGN PATENT DOCUMENTS 281440 12/1927 United Kingdom ............ 464/174

Primary Examiner—Daniel P. Stodola
Assistant Examiner—William G. Battista, Jr.
Attorney, Agent, or Firm—Armstrong, Nikaido, Marmelstein, Kubovcik & Murray

[57] ABSTRACT

A meter cable sheath structure for accommodating a flexible rotary shaft suitably used for vehicle indicators is made in such a manner that a high tension resistible fiber impregnated with adhesive resin is braided around an external surface of an inner sheath having a hollow space for storing the flexible rotary shaft and further an external covering layer firmly adhered to the high tension fiber is formed by means of the adhesive resin.

1 Claim, 1 Drawing Sheet

SHEATH STRUCTURE FOR METER CABLES

This application is a continuation of application Ser. No. 345,332 filed May 1, 1989, now abandoned.

BACKGROUND OF THE INVENTION

1. Field of the Invention

The present invention relates to a sheath structure for a meter cable accommodating a flexible rotary shaft suitably used for vehicle indicators.

2. Prior Art

Generally, a meter cable having a flexible rotary shaft inserted into a guiding tube is applied for transmitting rotational movements of transmission gears provided in a vehicle or the like to the speed meter thereof and so on. As a conventional type of the sheath structure for the meter cable having a flexible rotary shaft therein, it is already known to provide such an arrangement in which a metallic plate of a narrow width is wound in a helical form for making a flexible inner sheath with a hollow inside thereof so as to accommodate the flexible rotary shaft in the hollow part thereof, and a fibrous cable reinforcing member is braided around an external surface of the inner sheath and then resin such as a molten synthetic rubber or the like are injected to be molded thereon for forming an external sheathing resin or a covering layer so as to form the vehicle sheath structure. In this case above, a high tension material such as polyaramide fiber, a wire or the like are normally used to form the cable reinforcing member.

SUMMARY OF THE INVENTION

However, in this type of conventional art, when a high tension is applied to the cable, a certain sliding movement may occur between the reinforcing material and the external covering layer due to the difference in the quality thereof, whereby only the sheath resin is expanded. Furthermore, the above sliding movement occurs also in accordance with a temperature fluctuation around the meter cable due to the difference of coefficient of linear expansion rate between the both materials, whereby a certain displacement in length is generated between the inner sheath and the covering layer, making it impossible to use in a place where a frequent temperature fluctuation may occur. In order to solve this problem, there has been invented a product that a plurality of covering layers are piled one on another so as to increase a friction coefficient thereamong. However, it provides difficulty in producing the covering layer and may also increase a cost of the product.

In addition, in the case that a wire is applied for a reinforcing material, there has been another problem that a vibratory sound such as a rotary striking sound and the like generated when the flexible rotary shaft is rotated within the inner sheath may easily be transmitted, so that the above mechanical noise becomes a major problem, resulting that it does not meet the needs in the market.

The object of the present invention is, in view of the above-mentioned problems, to provide a meter cable of a sheath structure that is endurable against frequent temperature fluctuation and a high tension, yet greatly prevents transmission of the vibratory sound.

In order to accomplish the above-mentioned object, the sheath structure of the meter cable of the present invention is constructed such that a high tension resistible fiber as the cable reinforcing material impregnated with adhesive resin is braided around an external surface of the inner sheath, thereby to form an external covering layer adhered to and connected with the high tension resistible fiber by means of the adhesive resin.

DETAILED DESCRIPTION OF THE EMBODIMENT

Figure 1:
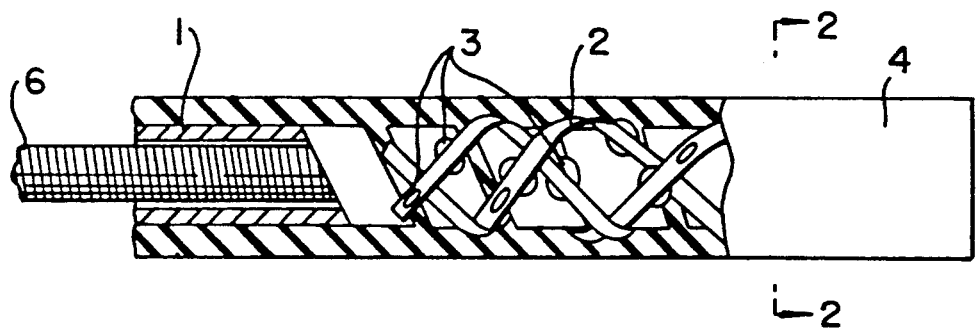
FIG. 1 is a partly cut-away view of a meter cable for showing a preferred embodiment of the present invention.
Figure 2:
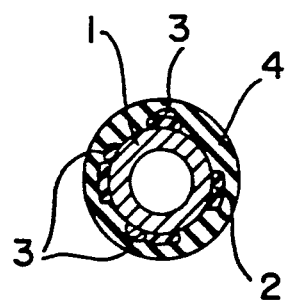
FIG. 2 is a sectional view taken along a line 2—2 of FIG. 1.

Referring now to the drawings, a preferred embodiment of the present invention will be described. FIG. 1 is a view, partly cut-away, for showing a meter cable of the present invention and FIG. 2 is a sectional view taken along a line 2—2 of FIG. 1. In these figures, a reference numeral 1 denotes an inner sheath which is formed in such a manner that a metallic plate of a narrow width is wound in a helical form to make a flexible inner sheath with a hollow space therein for a flexible rotary shaft 6. A reference numeral 2 designates a high tension resistible fiber braided in a net-like form which may function as a reinforcing material for the whole sheath structure of a meter cable. In the preferred embodiment of the present invention, a plurality of filaments of polyaramide fiber are combined to one another to form this reinforcing material. Polyaramide contains some superior features such as a high tension resistible strength that prevents softening and melting thereof even at a high temperature. As the reinforcing high tension resistible fiber, it is also possible to use a glass fiber, a carbon fiber and so on. The polyaramide fiber 2 is impregnated with the resin such as mixture of polypropylene and polyamide or the like which can be thermally melted and has a high adhering ability. The resin is impregnated into the filaments themselves and adhered to one another, and a plurality of resin blocks 3 formed of the same resin mixture are formed outside the polyaramide fiber 2 as well. In this way, the polyaramide fiber 2 is braided around an external surface of the inner sheath 1 and placed in a mold (not shown), and then the resin such as synthetic molten rubber is injected by means of an extruder or the like over the fiber to form the external covering layer 4. The polyaramide fiber 2 is held between the inner sheath 1 and the synthetic rubber, wherein it not only intrudes into the external covering layer of synthetic rubber, but at the same time the resin impregnated into the polyaramide fiber 2 and the resin blocks 3 are melted again, so that the polyaramide fiber 2 and the covering layer 4 are adhered to each other to form an integral unit. The molten adhesive resin blocks 3 may also be impregnated into the space between the covering layer 4 and the inner sheath 1 so as to adhere and fix to each other.

As described above, since the polyaramide fiber 2 functioning as the reinforcing material and the covering layer 4 are firmly adhered to each other, the polyaramide fiber 2 may cover a certain disadvantage of the resin made of synthetic molten rubber forming the covering layer 4 concerning the thermal expansion rate or a anti-tension strength thereof, resulting in forming the sheath structure of the meter cable remarkably endurable against a temperature fluctuation or a tension force.

Compared with the conventional type meter cable wherein the reinforcing material and the external covering layer are not firmly adhered to each other, a longitudinal expansion and contraction rate of the covering layer generated in the ambient temperature fluctuation from −40° C. to 100° C. is improved from 0.8% to 0.2% or less than that by applying the present invention, and thus the present invention can be used in a stable manner even at a place where a severe temperature fluctuation may occur. As compared with a case in which a wire is applied as a reinforcing material, a product having the polyaramide fiber 2 therein shows a better absorption of vibration, resulting in that a rate of attenuation is improved by −3 dB in the ambient vibration range from 0 to 5 kHz. In addition, in view of a similar reason, a sound insulating characteristic is also improved by 5 dB.

The sheath structure of the present invention may be applied to a sheath structure for a general type of electric wire or an optical fiber cable.

As described above, according to the present invention, since the resin forming the external covering layer and a high tension endurable fiber forming the reinforcing member for the whole sheath structure are firmly adhered to each other, it is possible to provide a sheath structure for a meter cable wherein an expansion or contraction against a temperature fluctuation is low, a resisting strength against tension force is high and an attenuation of noise is also fairly high. In addition, it is not necessary to make a plurality of overlappings of covering layers, thereby making it possible to reduce the cost of the product.

What is claimed is:

1. A sheath structure for a cable comprising:
   a flexible rotary shaft;
   a helical-shaped inner sheath having a hollow space for accommodating said rotary shaft therein;
   a fibrous tension resistible reinforcing member braided around an external surface of said inner sheath;
   an adhesive resin impregnated in said fibrous tension resistible reinforcing member;
   adhesive resin blocks formed along an external surface of said fibrous tension resistible reinforcing member; and
   an external covering layer molded on the external surface of said fibrous tension resistible reinforcing member; characterized in that said external covering layer is firmly attached to said fibrous tension resistible reinforcing member by means of said impregnated adhesive resin and said adhesive resin block so as to form an instant integral unit by only molding said external covering layer on the external surface of said reinforcing member.

* * * * *